United States Patent [19]

McIntyre et al.

[11] Patent Number: 5,797,051
[45] Date of Patent: Aug. 18, 1998

[54] NON-PHOTOGRAPHIC STRIP HAVING A BASE LAYER SIMILAR TO A PHOTOGRAPHIC FILMSTRIP AND A MAGNETIC RECORDING LAYER

[75] Inventors: Dale Frederick McIntyre, Honeoye Falls; J. Kelly Lee, Rochester, both of N.Y.

[73] Assignee: Eastman Kodak Company, Rochester, N.Y.

[21] Appl. No.: 637,116

[22] Filed: Apr. 24, 1996

[51] Int. Cl.$^6$ .............................. G03B 17/24; G03B 17/26
[52] U.S. Cl. .............................. 396/319; 396/512
[58] Field of Search .............................. 396/310, 319, 396/321, 429, 511, 512, 516, 297

[56] References Cited

U.S. PATENT DOCUMENTS

| | | | |
|---|---|---|---|
| 3,782,947 | 1/1974 | Krall | 396/319 |
| 4,325,620 | 4/1982 | Holley | 396/512 |
| 4,903,055 | 2/1990 | Lourette et al. | 396/512 |
| 4,958,181 | 9/1990 | Ishikawa et al. | 396/319 |
| 5,229,810 | 7/1993 | Cloutier et al. | 396/319 |
| 5,472,831 | 12/1995 | Nishiura et al. | 396/512 |

*Primary Examiner*—Safet Metjahic
*Assistant Examiner*—Nicholas J. Tuccillo
*Attorney, Agent, or Firm*—Gordon M. Stewart

[57] ABSTRACT

A non-photographic strip includes a base layer similar in properties and characteristics to a base layer of a known photographic filmstrip and a magnetic recording layer over the base layer. A cartridge is sized and shaped to be received in a cartridge receiving chamber of a photographic camera. The cartridge contains the non-photographic strip which is sized and shaped to be moved within the camera from the cartridge. Preferably, the magnetic recording layer is opaque. The magnetic recording layer is used to transfer information to and/or from the camera.

5 Claims, 4 Drawing Sheets

NON-PHOTOGRAPHIC STRIP HAVING A BASE LAYER SIMILAR TO A PHOTOGRAPHIC FILMSTRIP AND A MAGNETIC RECORDING LAYER

FIELD OF THE INVENTION

The invention relates generally to the field of photography, and in particular to cameras. More specifically, the invention relates to a non-photographic strip having a base layer similar to a photographic filmstrip and a magnetic recording layer.

BACKGROUND OF THE INVENTION

Prior art cameras disclose a number of ways for the camera operator to input information into the camera. For example, U.S. Pat. No. 4,958,181 discloses a camera system having a camera and an external device (IC card 4) detachably mounted on the camera by a holder 5. When the external device is mounted on the camera, they are connected electrically with each other and communicate therebetween in order to read a program or data memorized in the external device into a memory in the camera. The camera is controlled according to the program designated by the external device.

Such an arrangement for inputting information into a camera is less than optimal for several reasons. Extra hardware (i.e. holder 5 and the appropriate electrical connections) is required in the camera, thereby increasing the size and cost of the camera. The camera operator must carry around another type of paraphernalia (i.e. IC card 4) and learn how to properly insert the card into the holder, consequently increasing the complexity of operation of the camera.

Another method of inputting information into a camera is disclosed in commonly-assigned U.S. Pat. No. 5,229,810 (the '810 patent). This patent discloses that a virtually transparent magnetic layer is included as an additional layer in a photographic filmstrip. The magnetic layer must be transparent so that light can be transmitted through the filmstrip when making photographs or viewing slides. Information exchange between various users of the film such as the film manufacturer, the camera user, the dealer and photofinisher is facilitated by plural longitudinal magnetic tracks on the film that begin and end within individual frames. Each track is dedicated to the writing and reading of a predetermined set of parameters relating to the corresponding frame, for easy access by a particular one of the various users. Each user has the capability to read and/or write information in self-identifying data in the corresponding tracks. FIG. 4 discloses a camera with a magnetic read/write head.

In order to make the magnetic layer virtually transparent, it is made extremely thin, and the magnetic particle distribution and size are so designed that the composite granularities of the photographic and magnetic media are matched (see U.S. Pat. No. 3,782,947 to Krall). As a result, information stored on the transparent magnetic layer emits extremely weak magnetic signal levels relative to information stored on conventional video and audio cassette tapes which utilize a conventional opaque magnetic layer. Consequently, data recording and reading with the transparent magnetic layer is not very robust compared with more conventional opaque magnetic recording layers. Therefore, attempting to impart a large amount of data from a transparent magnetic layer of a photographic film to a camera risks data loss.

Additionally, the information density which can be stored and subsequently read to/from a transparent magnetic layer is much less than with conventional opaque magnetic layers. Thus, a much larger area of transparent magnetic material must be used to store the same amount of information which can be stored on a smaller area of conventional opaque magnetic material.

SUMMARY OF THE INVENTION

The present invention is directed to overcoming one or more of the problems set forth above. Briefly summarized, according to one aspect of the present invention, a non-photographic strip includes a base layer similar in properties and characteristics to a base layer of a known photographic filmstrip and a magnetic recording layer over the base layer.

According to another aspect of the present invention, a cartridge is sized and shaped to be received in a cartridge receiving chamber of a photographic camera. The cartridge contains a strip sized and shaped to be moved within the camera from the cartridge. The strip is non-photographic and includes a magnetic recording layer. Preferably, the magnetic recording layer is opaque.

By providing a non-photographic strip with a photographic-like base layer and a magnetic recording layer, information can be transferred between the magnetic layer and a camera more reliably. Because the strip is non-photographic, an opaque magnetic recording layer may be used, thereby providing stronger magnetic signals and higher information density. Further, by using a cartridge sized and shaped to be received in a camera chamber, and a strip sized and shaped to be moved within the camera from the cartridge, a large amount of information can be transferred to/from the camera without having to add additional hardware to the camera or use a different type of information storage device (e.g. an IC card).

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
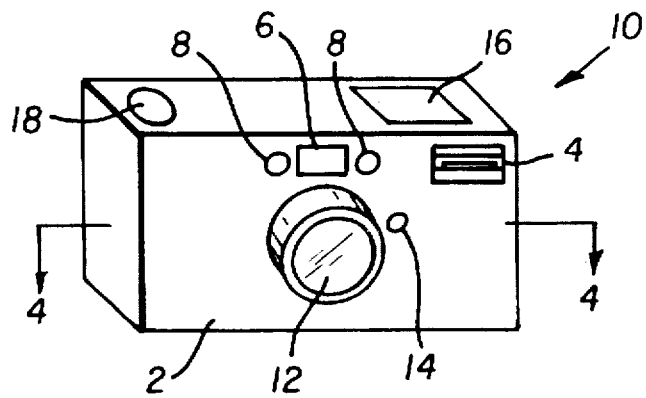
FIG. 1 is a schematic perspective view of a camera.

Beginning with FIG. 1, a non-single-lens-reflex camera, designated generally by the reference numeral 10, includes a camera body 2, a flash assembly 4 for providing supplemental illumination when necessary during picture taking, and a viewfinder 6 used by a camera operator for composing a scene to be recorded on photographic film loaded in the camera. The camera also includes an objective lens 12 for focusing scene light onto the film, an active autofocus emitter/detector pair 8 used to detect the camera-to-scene distance such that the objective lens can be moved to the proper focus position, and a light meter 14 for measuring scene ambient light such that the correct aperture and shutter speed can be selected.

The camera also has a liquid crystal display (LCD) 16 for presenting situation specific information as the operator exercises the various functions of the camera. Messages may be present on the LCD as pictograms and/or as actual text. In either case, this data comes from the camera's internal memory where it had been recorded (a) prior to delivery of the camera as an integral part of camera manufacturing and (b) from a data cartridge (described below).

A shutter button 18 operates a two stage switch. During normal picture taking, the first stage is characterized by activities such as acquiring exposure data, focus position, etc. while the second stage is responsible for completing the exposure by actuating a shutter mechanism. In the present invention, shutter button 18 serves an additional purpose of scrolling through a mode selection menu presented in LCD 16 upon the camera's recognition that the cartridge is not a photographic film cartridge but rather a data cartridge. The first stage is characterized by the scrolling function while the second stage actually initiates the entry into the selected data mode.

Camera 10 is designed to be used with a cartridge containing a photographic filmstrip which includes a virtually transparent magnetic recording layer such as disclosed in the '810 patent. The cartridge preferably includes a light-lock door movable between a closed position, sealing the cartridge in a light-tight manner, and an open position for allowing the filmstrip to exit the cartridge past the door. Once the door is opened, the filmstrip is thrust from the cartridge by rotating a spool within the cartridge around which the film is wound. Such a cartridge is disclosed in the prior art.

Figure 2:
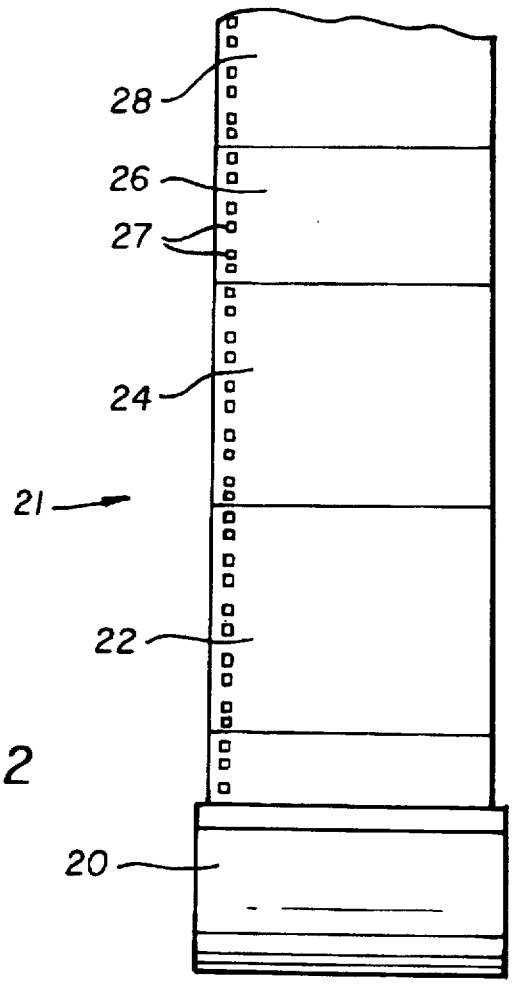
FIG. 2 is a top schematic view of a cartridge and a strip attached to the cartridge.

Turning to FIG. 2, a data cartridge 20 according to the present invention is disclosed which is similar in many ways to the cartridge described in the previous paragraph. Cartridge 20 is sized and shaped to be received in a cartridge receiving chamber of camera 10 (see FIG. 4). The main difference between the cartridge described in the previous paragraph and cartridge 20 is that the latter contains a non-photographic strip 21 which is sized and shaped to be moved within camera 10 from cartridge 20. Strip 21 does not have any photographic emulsion layers such as are found in conventional photographic film. Strip 21 includes a base layer 23 similar in properties and characteristics to a base layer of a known photographic filmstrip. For example, base layer 23 can be made of polyethylene-terepthalate or acetate. A magnetic recording layer 25 is coated over base layer 23. The magnetic recording layer is a conventional magnetic recording layer such as is found on audio or video cassette tapes. Typically, such conventional magnetic recording layers are opaque. A series of perforations 27 are located adjacent an edge of strip 21 and are used for metering strip 21 within camera 10.

Strip 21 is shown with a visual memory map of the data stored on the cartridge. Strip 21 includes a leader section 28 of the magnetic layer on which are recorded address pointers to the beginning of each data section. The address pointers are used by camera 10 when accessing the data (information) to execute a specific mode. A section 26 of the magnetic layer has recorded thereon personal information such as the camera user's name and address.

Cameras with complex functions require a significant amount of instructions for proper use. These instructions are normally printed matter which is not always effective for all customers (when they can find them). With a convenient way to input data into the camera, inputting an interactive user manual via reading a data cartridge saves the cost and confusion of printed matter. Therefore, a section 24 of the magnetic layer has recorded thereon an interactive user manual with tutorial and help information associated with camera operation. In this operating mode, user interaction, such as the proper procedure for loading the camera, can be guided/verified by the camera's LCD 16. Likewise, random actuation of the camera's main functions by the user results in a confirmation of the specific actions that the user performed.

A section 22 of the magnetic layer has recorded thereon trouble-shooting information used for diagnosing camera malfunctions. In this mode, certain subsystems of the camera are exercised and their results reported to the LCD.

Each data section 22, 24, 26 begins at a particular perforation on strip 21 whereby the camera can rapidly advance the strip to the correct perforation for accessing a particular data section. Once the strip has been moved to the correct data section, the strip is moved more slowly such that data in the section can be read by a magnetic head in the camera. By starting the data section coincident with a film perforation, data section access can be most rapidly achieved with the film advance electronic metering already resident in the camera electronics. It is not necessary however to do so. Slower serial access can still be achieved by reading the data tracks until the proper data address is reached.

Figure 3:
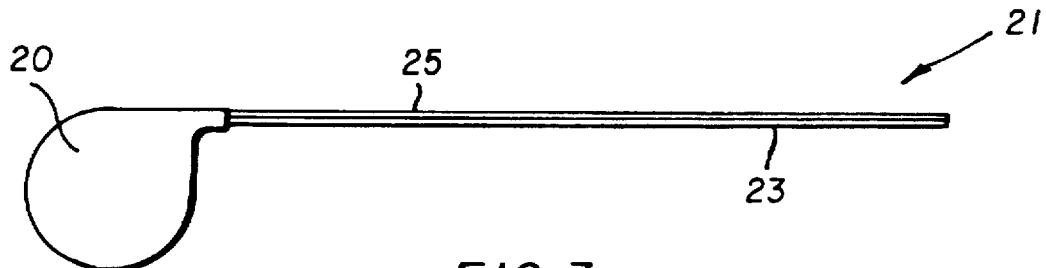
FIG. 3 is a side view of the cartridge and strip of FIG. 2.

FIG. 3 show the phases (1-4) of scrolling produced by the shutter button just being actuated repeatedly to its first stage position. The LCD in this case uses fixed segments to represent the words indicative of the selected mode. Another technique would be to use a controllable matrix of segments that could be programmed to represent each word without dedicating physical LCD space to the task.

Figure 4:
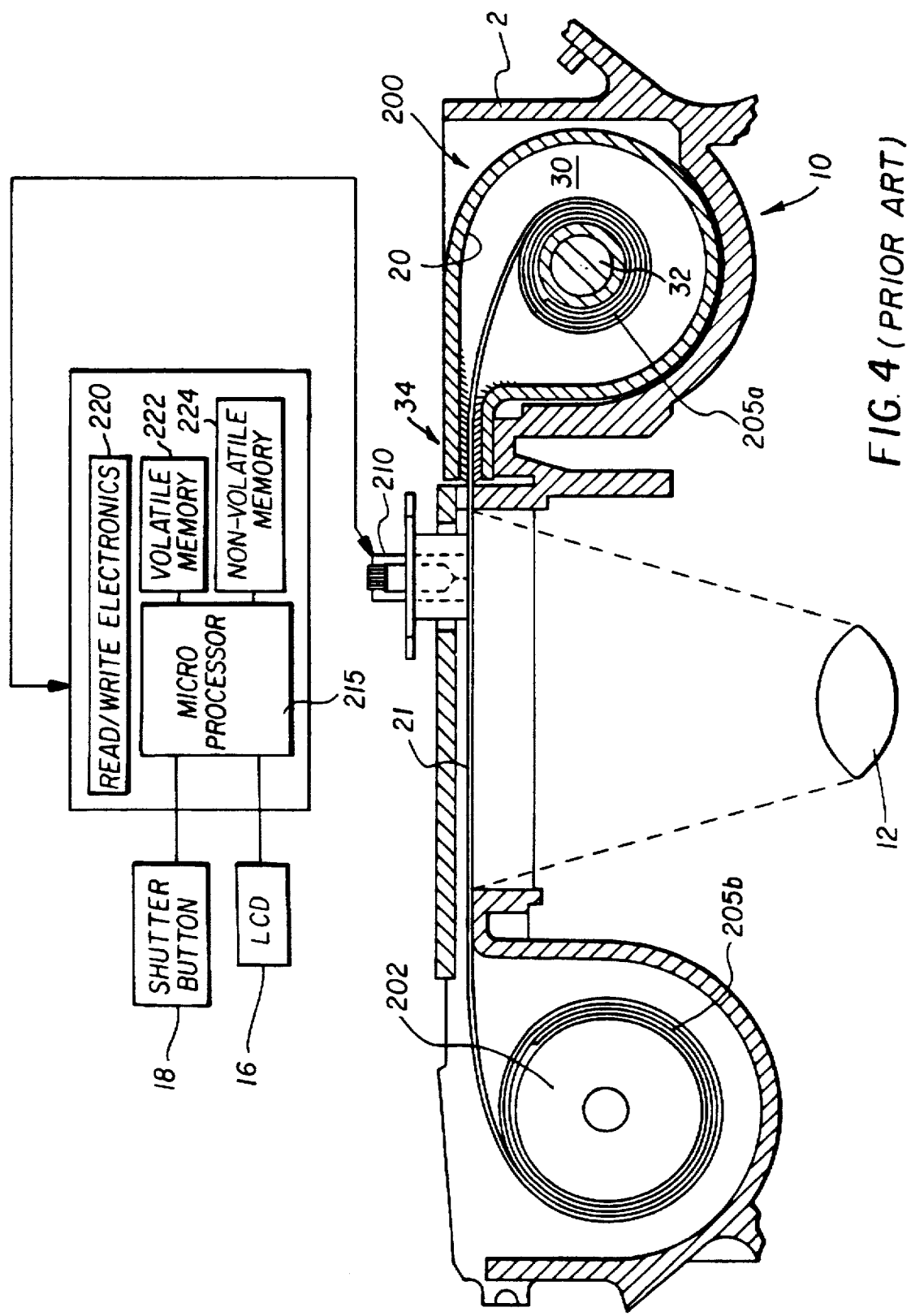
FIG. 4 is an internal sectional view of the camera of FIG. 1 taken along lines 4—4.

Referring to FIG. 4, camera 10 is shown with cartridge 20 loaded in a cartridge receiving chamber 200 of the camera. Cartridge 20 includes only one chamber 30 for containing strip 21 and only one spool 32 around which the strip is wound. A slot 34 in cartridge 20 can be made non-light-tight by opening a light-lock door (not shown) described above, thereby allowing strip 21 to exit the cartridge. The camera transports strip 21 between reels 205a,b of cartridge 20 and a take-up spool 202, respectively, as is well known in the art. Camera 10 includes a magnetic read/write head 210 facing the magnetic layer 25 of strip 21. A microprocessor 215 controls magnetic data recording or playback by the head through head electronics 220. The camera also includes a volatile memory 222, such as RAM, and a non-volatile memory 224, such as flash RAM or an EEPROM.

Camera 10 further includes a photo-interrupter (not shown) located near where strip 21 exits cartridge 20 and aligned with the path of travel of perforations 27 in strip 21. The photo-interrupter includes a radiation emitter and detector located on opposite sides of strip 21. As strip 21 is moved in the camera, the perforations periodically allow radiation from the emitter to reach the detector. The detector emits an electrical signal dependent on the amount of light incident on it. As such, microprocessor 215 knows the position of strip 21 while the strip is outside of cartridge 20. The camera also includes a strip transport system, not shown, having a motor and gearing for moving the strip within the camera. Such a strip transport system is well known to those skilled in the art.

Figure 5:
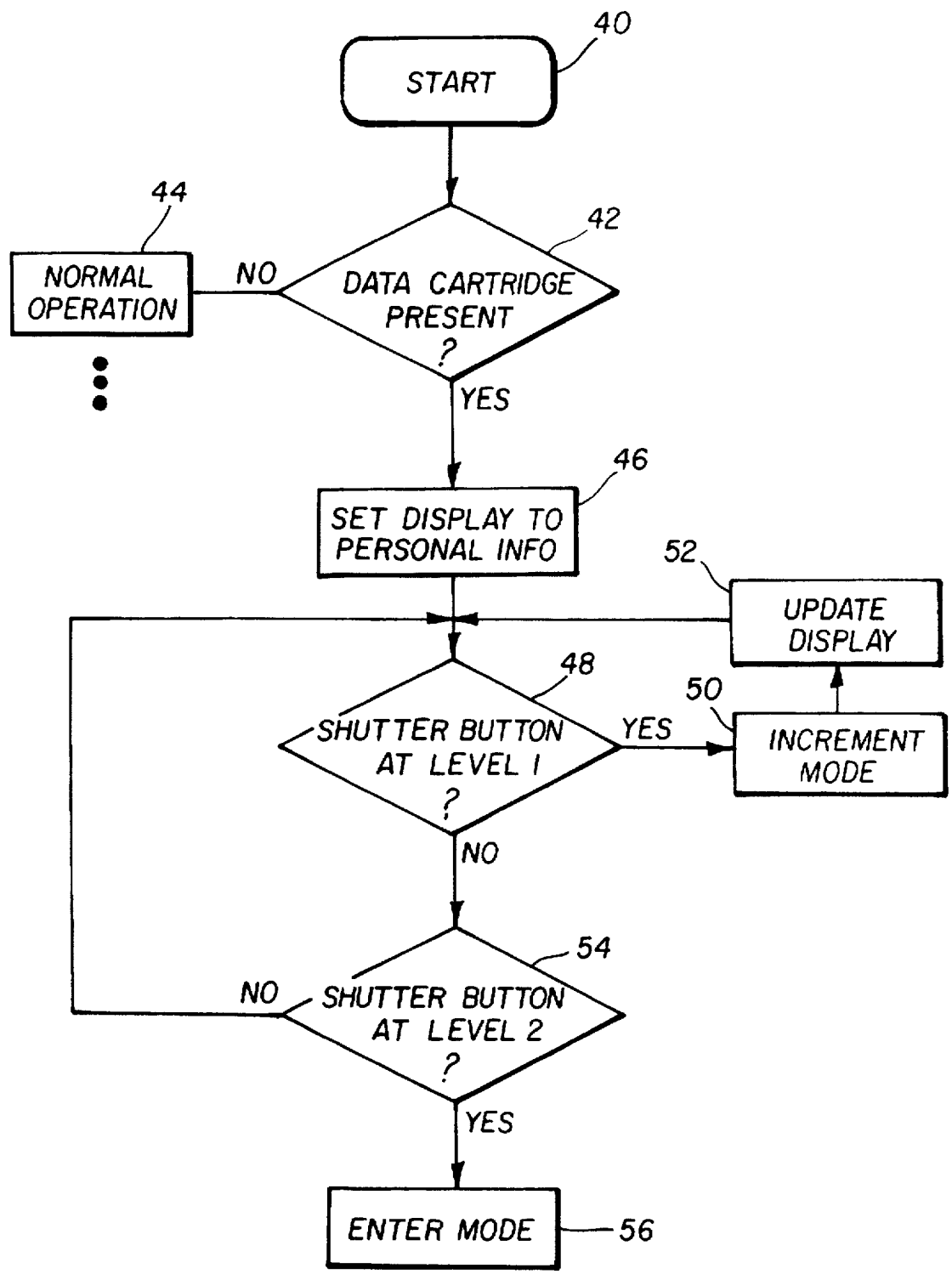
FIG. 5 is a flow chart of logic used by the camera of FIG. 1 when using the cartridge of FIG. 2.

Turning now to FIG. 5, the logic used by microprocessor 215 when cartridge 20 is loaded in the camera will be described. At a step 40 the camera is powered up. At a step 41, microprocessor determines whether a regular photographic film cartridge or data cartridge 20 has been inserted into chamber 200. This determination can be made in a number of ways. A special DX code can be provided on the outside of cartridge 20 to inform camera 10 that it is a data cartridge. Alternatively, microprocessor 215 can cause strip 21 to be moved past head 210 while head 210 reads a prerecorded signal stored on leader section 28 of the magnetic layer. If the read signal is relatively strong, indicating an opaque, conventional magnetic layer, microprocessor knows a data cartridge has been loaded in chamber 200. If the read signal is relatively weak, indicating a transparent magnetic layer, microprocessor knows a photographic filmstrip cartridge has been loaded in chamber 200.

Figure 6A:
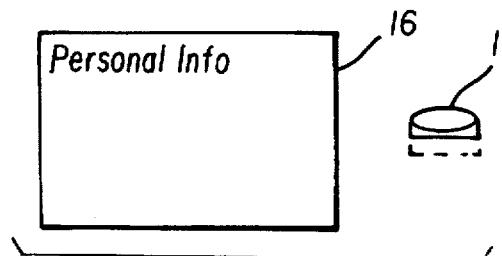
FIGS. 6A–D show a shutter button and LCD of the camera shown in FIG. 1.
Figure 6B:
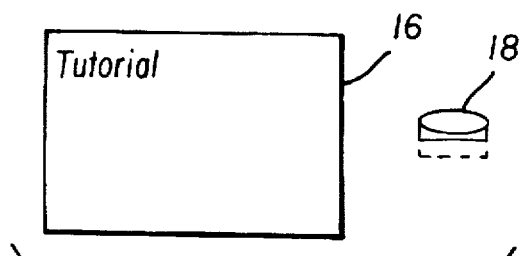
Figure 6C:
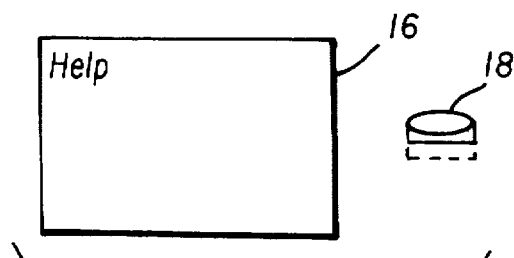
Figure 6D:
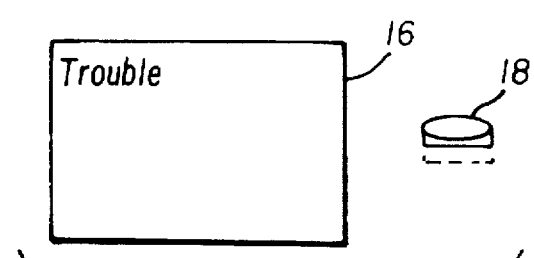

If data cartridge 20 is not present, the logic proceeds to step 44 where the camera enters normal operation for picture taking. If data cartridge 20 is present, the logic proceeds to step 46 where LCD 16 is set to display "Personal Info" (see FIG. 6A). Next, the logic proceeds to a step 48 where the microprocessor determines whether two-stage shutter button 18 has been pressed to the first stage (level 1). The camera operator would press the shutter button to level 1 if (s)he did not want to load personal information into the camera, but rather wanted to access the Tutorial, Help or Trouble data sections (see FIGS. 6B–D). Each successive press of the shutter button to level 1 increments the LCD to display the next data section. If the shutter button has been pressed to level 1, the logic proceeds to step 50 where the mode is incremented, for example, to the Tutorial data section. The LCD is updated to display "Tutorial" at step 52 and the logic returns to step 48.

If shutter button 18 has not been pressed to level 1, the logic proceeds to step 54 where microprocessor 215 determines whether the shutter button has been pressed to level 2. If shutter button 18 has not been pressed to level 2, the logic returns to step 48. If shutter button 18 has been pressed to level 2, the logic proceeds to step 56 where the present mode is entered. If the camera enters the *Personal Info mode, microprocessor 215 causes the strip transport system to rapidly move strip 21 out of cartridge 20 to the start of Personal Info section 26 on strip 21. As stated above, the microprocessor uses information from the photointerrupter to discern the position of strip 21. Once the strip is properly positioned at the start of Personal Info section 26, microprocessor 215 slows down the strip transport system to a slower speed appropriate for enabling head 210 to read the personal information from magnetic layer 25. This personal information is then stored in non-volatile memory 224 and will be retained even when the camera is shut off. In order to return strip 21 completely into cartridge 20, the operator presses shutter button 18 to level 2 and holds it there for a predetermined time such as three seconds. Such action instructs microprocessor 215 to have the strip returned to the cartridge The personal information stored in camera 10 is used when a photographic filmstrip cartridge, having a transparent magnetic layer in the filmstrip, is loaded in the camera after data cartridge 20 is removed from the camera. Prior to the photographic filmstrip cartridge being removed from the camera, microprocessor 215 causes magnetic head 210 to write the personal information, such as the camera user's name and address, onto the transparent magnetic layer. This information can be recorded in one location on the filmstrip or with each frame. The personal information can be used to identify the owner of the photographic filmstrip cartridge if, for example, the cartridge gets misplaced during photofinishing.

If the camera operator decides to enter the "Tutorial", "Help" or "Trouble" modes, (s)he presses shutter button 18 to level 1 successively until the desired mode is displayed on LCD 16. The operator then presses the shutter button to level 2 to enter the desired mode. The microprocessor causes strip 21 to be rapidly moved to the beginning of the selected mode and then reduces the speed of the strip such that information stored on magnetic layer 25 can be read by magnetic head 215. The read information is stored in volatile memory 222 of camera 10 for presentation on LCD 16. The operator can use a pair of buttons (not shown) to scroll up or down through the information presented on the LCD. As such, the camera user can quickly access "Tutorial", "Help" or "Trouble" information such that camera 10 can be used most effectively. The data stored in volatile memory is discarded after a photographic filmstrip cartridge is loaded in camera 10 and a film frame is positioned for image capture.

The reason why this data is stored in volatile memory is that it is not cost effective to build cameras with complete "Tutorial", "Help" and "Trouble" data stored in non-volatile memory. With the present invention, data can be loaded into the camera and used interactively rather than using a paper manual. Warranty information, serial number, date of purchase, Kodak 1-800 number etc. can all be retrieved without having to find a user manual that is rarely used and frequently misplaced or discarded.

According to another aspect of the invention, microprocessor 215 allows magnetic head 210 to both read information from and write information to magnetic recording layer 25 when the microprocessor detects that a data cartridge has been loaded in the camera. However, when microprocessor 215 detects that a regular photographic filmstrip cartridge has been loaded in the camera, the microprocessor only allows magnetic head 210 to write information to but not reading information from the transparent magnetic recording layer on the regular photographic filmstrip. The reason for this arrangement is that many cameras have a magnetic head that is not sensitive enough to read the weak magnetic signal from information stored on the transparent magnetic layer of the photographic filmstrip cartridge. In this case, the magnetic head is only used to write information to the transparent magnetic layer. The data cartridge however has a conventional magnetic coating which emits a much stronger magnetic signal. As a result, the magnetic head is used to both read information from and write information to the magnetic recording layer 25.

Figure 7:
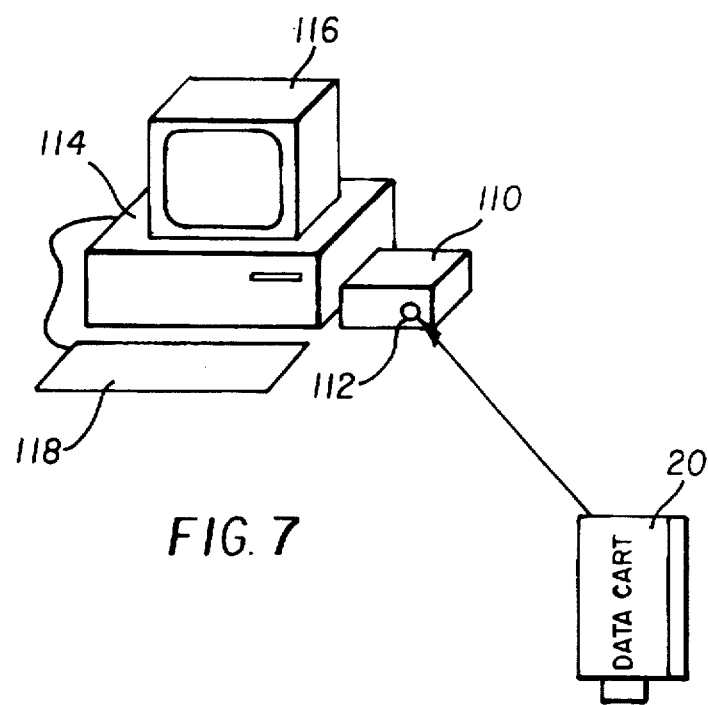
FIG. 7 is a perspective view of a computer workstation and data cartridge writer.

FIG. 7 illustrates a workstation which includes a computer 114, a monitor 116, a keyboard 118 and a data cartridge writer 110. Writer 110 includes a chamber 112 similar to chamber 200 in camera 10 and, a magnetic head and strip transport system also similar to magnetic head 210 and the strip transport system of camera 10. Data cartridge 20 is loaded into chamber 112 and strip 21 is transported past the magnetic head in writer 110 in order for the head to write data onto magnetic layer 25 of the strip. As discussed above, this information may include personal information about the operator as well as tutorial, help and trouble-shooting information about the camera with which the data cartridge is associated.

The workstation is preferably located at a camera dealer's retail location. A camera operator would bring their data cartridge, which was included with the camera when purchased, to the retail location to enter their personal information onto the data cartridge. The tutorial, help and trouble-shooting information was previously recorded onto the data cartridge by the camera manufacturer prior to the user buying the camera and data cartridge. Such a workstation may employ the user friendly interface indigenous to the Macintosh series computers by Apple Computer, Inc. The workstation runs software such as (a) FileMaker Pro, which provides a user friendly interface for acquiring database information or (b) a custom by-product application developed from HyperCard software. The HyperCard software allows complete customization and the creation of standalone applications which can act as databases. In addition, this software is capable of controlling external peripherals resident on the workstation's SCSI bus such as data cartridge writer 110.

The invention has been described with reference to a preferred embodiment. However, it will be appreciated that variations and modifications can be effected by a person of ordinary skill in the art without departing from the scope of the invention. For example, separate data cartridges can perform the individual modes that have been described above as being combined in a single data cartridge. In other words, one data cartridge contains the Tutorial/Help system while another cartridge has the troubleshooting section, etc. Separate cartridges can be used to teach the user how to operate his camera to capture a specific type of picture like a portrait, a close-up, a panoramic, or a motion shot.

PARTS LIST

2 Camera Body
4 Flash
6 Viewfinder
8 Active Autofocus
10 NSLR Camera
12 Taking Lens
14 Exposure Cell
16 LCD
18 shutter button
20 data cartridge
21 strip
22 troubleshooting data section
23 base layer
24 interactive help/tutorial data section
25 conventional opaque magnetic layer
26 personalization information data section
27 perforations
28 film leader
30 chamber
32 spool
34 slot
40–56 flow steps
110 cartridge writer peripheral
112 cartridge port
114 computer
116 monitor
118 keyboard
200 cartridge receiving chamber
202 take-up spool
205a,b reels
210 magnetic read/write head
215 microprocessor
220 head electronics
222 volatile memory
224 non-volatile memory

We claim:

1. A cartridge sized and shaped to be received in a cartridge receiving chamber of a photographic camera contains a strip having a base layer with two opposed elongated edges, and said strip being sized and shaped to be moved within the camera from the cartridge, and is characterized in that:

said strip is non-photographic from one edge of the base layer to the other, and includes magnetic recording means.

2. The cartridge of claim 1, wherein said magnetic recording means is opaque.

3. The cartridge of claim 1, wherein said cartridge includes only one chamber for containing the strip, only one spool around which the strip is wound, and a non-light-tight slot through which the strip can be moved from the chamber.

4. A photographic camera comprising a cartridge receiving chamber for receiving a cartridge containing a strip with magnetic recording means, is characterized by:

means for determining whether a cartridge loaded in the chamber has a strip with magnetic recording means providing a relatively strong magnetic field or a relatively weak magnetic field; and means for (a) both reading information from and writing information to the magnetic recording means when it provides a relatively strong magnetic field and (b) writing information to but not reading information from the magnetic recording means when it provides only a relatively weak magnetic field.

5. The photographic camera of claim 4, further including a magnetic head, and wherein said determining means includes means for causing the magnetic head to read a relatively strong or weak magnetic field from the magnetic recording means and means for ascertaining whether the read magnetic field is a relatively strong or weak magnetic field.

* * * * *